United States Patent [19]

Claassen

[11] 4,244,724
[45] Jan. 13, 1981

[54] DOUBLE LINK ARRANGEMENT FOR PRESS BENDING MOLDS

[75] Inventor: George R. Claassen, New Kensington, Pa.

[73] Assignee: PPG Industries, Inc., Pittsburgh, Pa.

[21] Appl. No.: 70,277

[22] Filed: Aug. 27, 1979

[51] Int. Cl.³ .............................................. C03B 23/03
[52] U.S. Cl. ....................................... 65/106; 65/273; 65/289
[58] Field of Search .................. 65/106, 107, 273, 275, 65/287, 289

[56] References Cited

U.S. PATENT DOCUMENTS

| | | | |
|---|---|---|---|
| 797,646 | 8/1905 | Wadsworth | 65/101 X |
| 2,677,918 | 5/1954 | Bird et al. | 65/268 |
| 2,680,936 | 6/1954 | Grotefeld | 65/107 X |
| 3,290,133 | 12/1966 | Thomas | 65/106 |
| 3,476,541 | 11/1969 | Ritter, Jr. | 65/268 |
| 3,607,200 | 9/1971 | McMaster | 65/106 X |
| 3,630,706 | 12/1971 | Oelke et al. | 65/106 X |
| 3,737,297 | 6/1973 | Frank | 65/273 |
| 3,846,104 | 11/1974 | Seymour | 65/106 X |
| 3,905,794 | 9/1975 | Revells et al. | 65/106 |
| 4,123,245 | 10/1978 | Bates | 65/106 X |

*Primary Examiner*—Arthur D. Kellogg
*Attorney, Agent, or Firm*—Donald Carl Lepiane; Edward I. Mates

[57] ABSTRACT

Shaping a tong-gripped glass sheet between pressing molds of complementary curvature while the glass sheet moves continuously from a furnace exit to a cooling area by moving the molds synchronously with the glass sheet and simultaneously toward and away from one another in such a manner that their relative orientation to one another is not changed during glass sheet engagement. When the mold movement is so controlled, there is less danger of twisting the tongs, which may damage the glass, the tongs and/or the molds, than when the mold orientation is changed during glass engagement.

7 Claims, 5 Drawing Figures

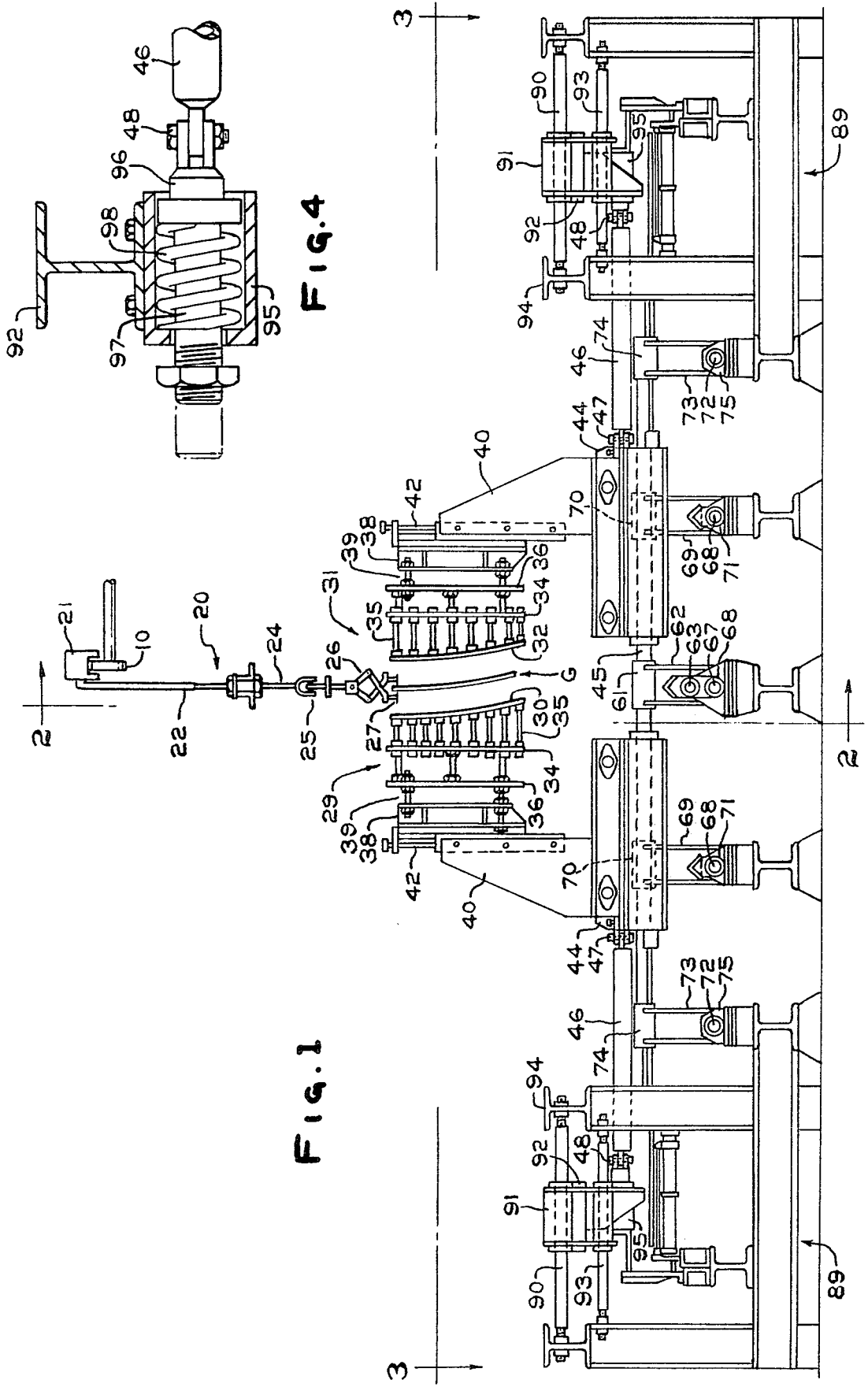

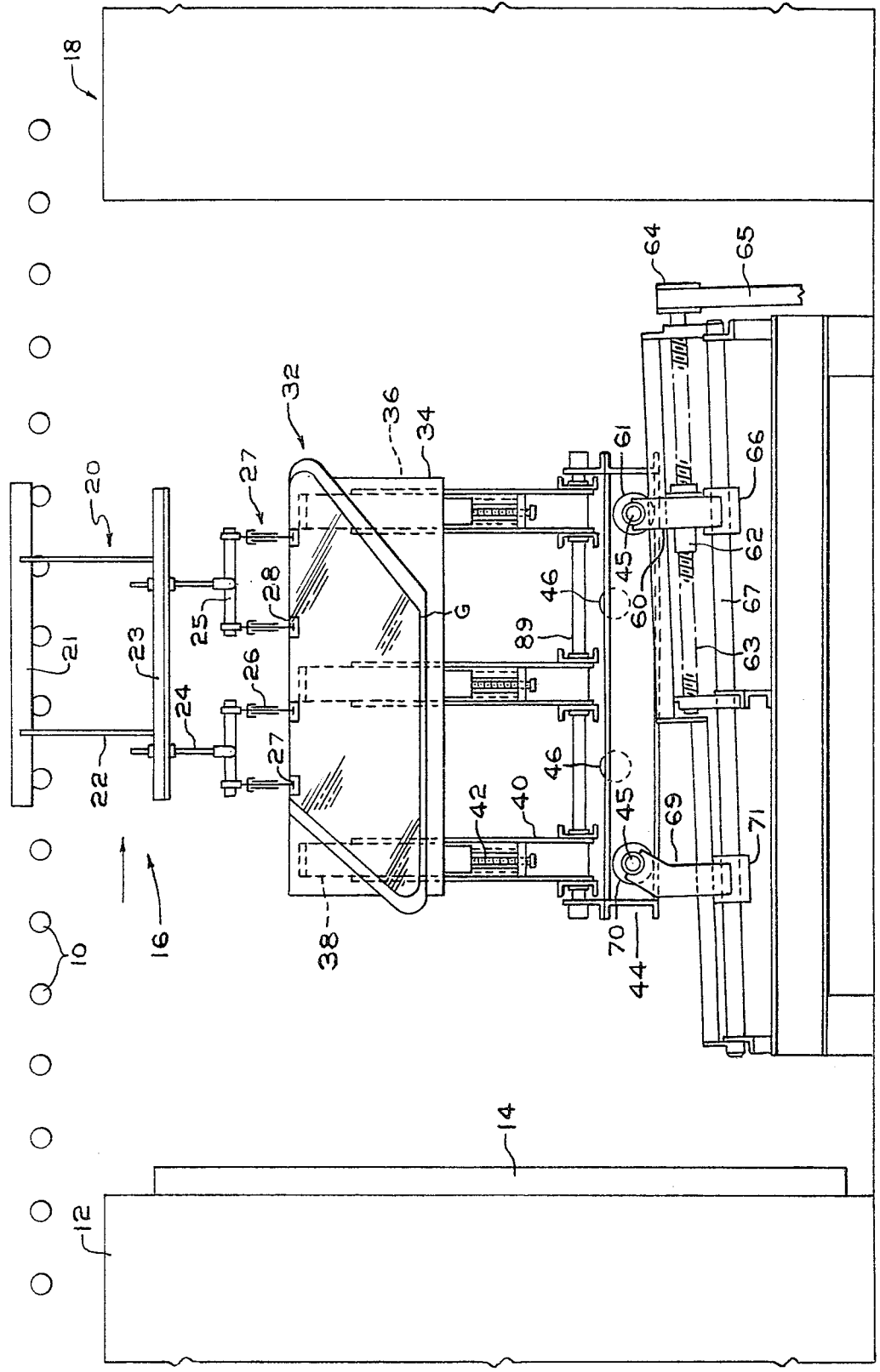

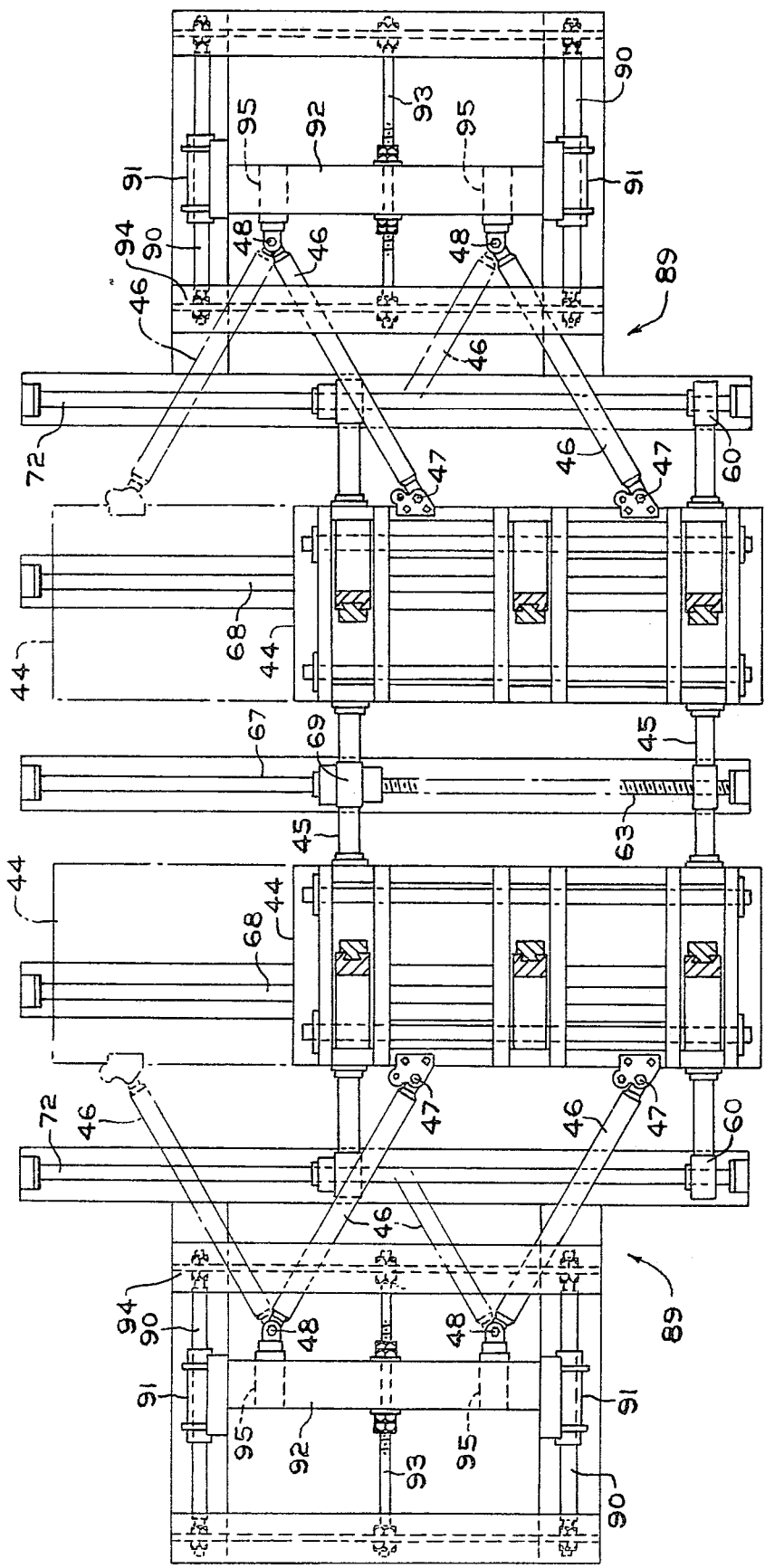

DOUBLE LINK ARRANGEMENT FOR PRESS BENDING MOLDS

BACKGROUND OF THE INVENTION

This invention relates to the press bending and tempering of glass sheets and particularly relates to the press bending of glass sheets of relatively thin dimensions such as 3 and 4 millimeters thickness. Glass sheets that are exceedingly thin are difficult to shape and temper, because thin sheets often crack due to excessive cooling before shaping with equipment designed for thicker glass. Furthermore, if the glass is heated to an elevated temperature at which it is very soft, it is very difficult to maintain the shape of the glass and to avoid indentation by tongs which grip the glass during its transfer from a furnace where the glass is heated to its deformation temperature to a shaping station where the glass sheet is engaged between complementary shaping molds of the press bending type and the cooling station where the glass is suddenly quenched on its major surfaces while the interior portion of the glass remains in a fluid condition. Unless the glass is heated within a narrower temperature range than that permitted for thicker glass and/or transferred from the furnace to the cooling station more rapidly than required for thicker glass, the glass will either lose its desired shape if heated too hot initially or become too cool to develop a sufficient temper if not heated initially to a sufficiently high temperature to compensate for its cooling during its conveyance to the cooling station.

Press bending molds for shaping glass sheets suspended from tongs are provided with slots in their upper edges to receive glass gripping tongs. These slots should be sufficiently large to enable the tongs to be received therein when the press bending molds close to engage a glass sheet for shaping. The tong clearance slots should be made as small as possible to provide maximum control for the shape the molds impress on the tong-gripped glass sheet during shaping by press bending.

When thin glass sheets are shaped between complementary shaping molds, the glass shaping molds sometimes impart a force on the tongs through the thin glass that causes the tongs to twist or tilt away from the shaped glass. Such tong twisting or tilting causes the glass to become distorted from its bend desired. Damage to tongs or molds used to process glass sheets may result from misalignment between tong clearance slots provided along the upper edge of the shaped press bending molds during the engagement of the shaped molds against the opposite major surfaces of a flat glass sheet when the tongs engage the molds instead of being received within the tong clearance slots. Extending the width of the slots reduces the likelihood of tong or mold damage due to direct mold contact by a tilted tong. However, widening the slots decreases the ability of the molds to control the glass sheet shape in the vicinity of the tong clearance slots. Other glass defects due to twisting or tilting of the tongs have been moderated to some extent for molds that engage a glass sheet at rest to shape the latter. However, no molds that move synchronously with a glass sheet through a shaping station have been able to consistently avoid the glass defects due to tong twist prior to this invention.

DESCRIPTION OF THE PATENTS OF INTEREST

U.S. Pat. No. 3,737,297 to Frank discloses apparatus for press bending glass sheets supported in a near vertical orientation. A first conveyor transports a glass sheet in a horizontal path through a heating furnace into a first mold position where a pair of retracted molds await the arrival of a glass sheet. The molds move to engage the glass sheet which has stopped momentarily and then move together with the glass to a second mold position whereby the glass is then transported by a second conveyor to a cooling area. The momentary stopping of the glass sheet to insure proper alignment between the glass sheet and the press bending molds increases the time that it takes the glass sheet to travel from the end of the furnace to the entrance to the cooling area.

U.S. Pat. No. 3,290,133 to Thomas discloses a technique for reducing the effect of glass-gripping tongs to distort the upper edge of the glass as the opposite pressing molds engage a stationary glass sheet and cause a phenomenom known as tong pull. The molds move together with vertically upward components of motion as they move toward one another during the engagement of the glass sheet therebetween to develop the desired bend with accompanying reduced tong pull.

U.S. Pat. No. 4,123,245 to Bates discloses apparatus for press bending and tempering thin glass sheets in which the glass sheet is suspended by tongs in a holding station at an elevated temperature until such time as a pair of press bending molds are in position to engage the opposite surfaces of the suspended glass sheet and to move in synchronism with the glass sheet while shaping the latter. The tongs are likely to indent the glass if caused to wait for too long a period at the heated holding station before the glass sheet and the pressing molds are in position to start a shaping and transfer operation. Furthermore, the pressing molds move against the opposite sheet surfaces in arcuate paths about horizontal axes that extend longitudinally of the direction of synchronous movement, thereby modifying the orientation of the shaping surfaces of the molds as they engage the glass sheet. This patent does not mention nor recognize any problems in press bending that are associated with using molds that change their orientation during glass sheet engagement.

U.S. Pat. No. 3,630,706 to Oelke et al. uses spring loaded molds constructed and arranged to move broadside against the opposite surfaces of a stationary glass sheet. Mold movement relative to the stationary glass sheet is controlled by a cam and cam follower arrangement. Continuous glass sheet movement is not provided in this patent with consequent postponement of the glass sheet arrival in the cooling area.

Other prior art patents which were cited in a novelty search are described in the following paragraphs. They all describe the prior use of multiple links in glass sheet processing operations. These additional patents either control synchronous movement of glass engaging members that do not involve glass sheet shaping or provide control for moving a glass sheet into a shaping station where the sheet is in a fixed position during shaping. Such stopping is not conducive to shaping and tempering of thin glass sheets.

U.S. Pat. No. 797,646 to Wadsworth provides linkages that interconnect a pair of plates that simultaneously engage the opposite surfaces of a glass sheet newly formed within a frame. The plates are either smooth to flatten or straighten the newly formed sheet or are provided with patterned surfaces to impress a surface pattern simultaneously onto the opposite surfaces of the sheet. This patent does not involve shaping a glass sheet between synchronizing movable shaping molds.

U.S. Pat. No. 2,677,918 to Bird et al. uses tong linkages and guide means to move a pair of opposite glass sheet engaging members against the opposite major surfaces of a glass sheet suspended in fixed position therebetween for shaping. No means is provided to move the glass sheet engaging members along a path parallel to the path of glass sheet movement.

U.S. Pat. No. 2,680,936 to Grotefeld shows the use of a pair of links operated in unison to help control the position of a glass sheet that is shaped by gravity sagging into a shaping mold and then lifted from mold engagement by link actuated glass engaging means which are operated simultaneously. No tongs are provided to support the glass sheet and there is no press bending between opposite moving molds in this patent.

U.S. Pat. No. 3,476,541 to Ritter discloses the use of a pair of links operating in unison to lift a lower mold part through the spaces between adjacent conveyor rolls to lift a glass sheet toward an upper mold part while the glass sheet is stopped between the mold parts. The link supported structure does not move in a direction parallel to that of the glass sheet in this patent.

U.S. Pat. No. 3,607,200 to McMaster uses a pair of links in a shuttle arrangement for rapidly transferring a glass sheet from a furnace to a shaping station where the glass sheet is stopped between a pair of glass sheet shaping members. The links move sheet engaging members toward one another simultaneously with movement along a path of glass travel outside of a shaping station only and do not operate simultaneously with the shaping members in this patent.

U.S. Pat. No. 3,846,104 to Seymour uses link means similar to those of the McMaster patent for moving a glass sheet into a location where the glass sheet stops intermediate upper and lower shaping molds.

U.S. Pat. No. 3,905,794 to Revells et al. uses a plurality of links to simultaneously pivot a plurality of shaped rolls from a flat sheet supporting orientation to a curved elevational configuration. The glass sheet is stopped and lifted into engagement between a pair of shaping molds at a shaping station. The rolls are oriented to their curved configuration to convey the shaped glass sheet out of the shaping station when the shaping molds are separated. Stopping the glass sheet for shaping increases the time needed for the glass sheet to reach a cooling area.

It is apparent that the prior art lacked a method of continuously and more rapidly moving tong-suspended glass sheets continuously through a press bending apparatus that causes less damage to the glass, the tongs and the molds.

SUMMARY OF THE INVENTION

It has now been discovered that a change in relative orientation of the opposing, synchronously moving press bending molds during glass sheet engagement is likely to rotate the tongs, thereby twisting the glass portion engaged by the tongs. In addition, the tong clearance slots may become misaligned when the relative orientation of the opposing moving mold changes, thereby causing the tongs to be misaligned with one or the other or both tong clearance slots. When the tongs engage the mold instead of the tong clearance slot during press bending, the tong or the mold is likely to be damaged.

In order to solve the previously mentioned cause of glass rejects or production stoppages, the present invention combines means for continuously moving glass sheets in an essentially horizontal downstream direction between a furnace and a cooling area while engaging the opposite surfaces of the glass sheet with a pair of synchronously moving press bending molds having complementary shaping surfaces with means to maintain the press bending molds' orientation relative to one another constant throughout the period of engagement with the glass sheet. In a specific apparatus embodiment of this invention, positive linkage means are provided in the form of a pair of links for each press bending mold. Each pair of links maintains one or the other of the opposite molds in proper orientation alignment with one another throughout their movement from an upstream recessed position where the molds await the arrival of the glass sheet adjacent the furnace exit through a glass-engaging position in the intermediate portion of the shaping station and then into a downstream recessed position wherein the shaped glass is transferred into the cooling area. The movement of the molds is in a slight upward inclination from the furnace to the cooling area relative to the longitudinal, horizontal movement path of the glass sheet so as to minimize tong pull during the engagement of the glass sheet. In an additional optional feature, at least one of the press bending molds is spring loaded to extend the duration of mold to glass sheet contact to improve the conformance of the glass sheet to its desired shape.

The present invention will be understood more clearly in the light of a description of a preferred embodiment which follows.

BRIEF DESCRIPTION OF THE DRAWINGS

In the drawings which form part of a description of a preferred embodiment of the present invention, FIG. 1 is a transverse view of a shaping station according to this invention with parts omitted, of support structure for supporting and moving a pair of press bending molds, shown in recessed relation to a shaped glass sheet, and shown provided with twin link components;

FIG. 2 is an elevational view taken along the lines 2—2 of the shaping station of FIG. 1, corresponding to a frontal view of one of the press bending molds showing its relation to said support structure at the instance of glass sheet engagement;

FIG. 3 is a horizontal sectional view along the line 3—3 of FIG. 1 corresponding to a plan view of the mold support structures showing in full lines the downstream retracted position of said mold support structure and its twin link components when the glass is released into the cooling area and showing in phantom the upstream retracted position of said mold support structure as its supported press bending mold awaits the arrival of the glass sheet as it leaves the furnace exit;

FIG. 4 is an enlarged sectional view along the line 4—4 of FIG. 3 of a spring loading mechanism used to urge a rear pivotal connection at the rear of one of the twin links to help urge mold movement toward a glass engaging position to increase the duration of mold to glass contact according to an optional embodiment incorporated as part of this invention.

DESCRIPTION OF THE PREFERRED EMBODIMENT

Figure 5:
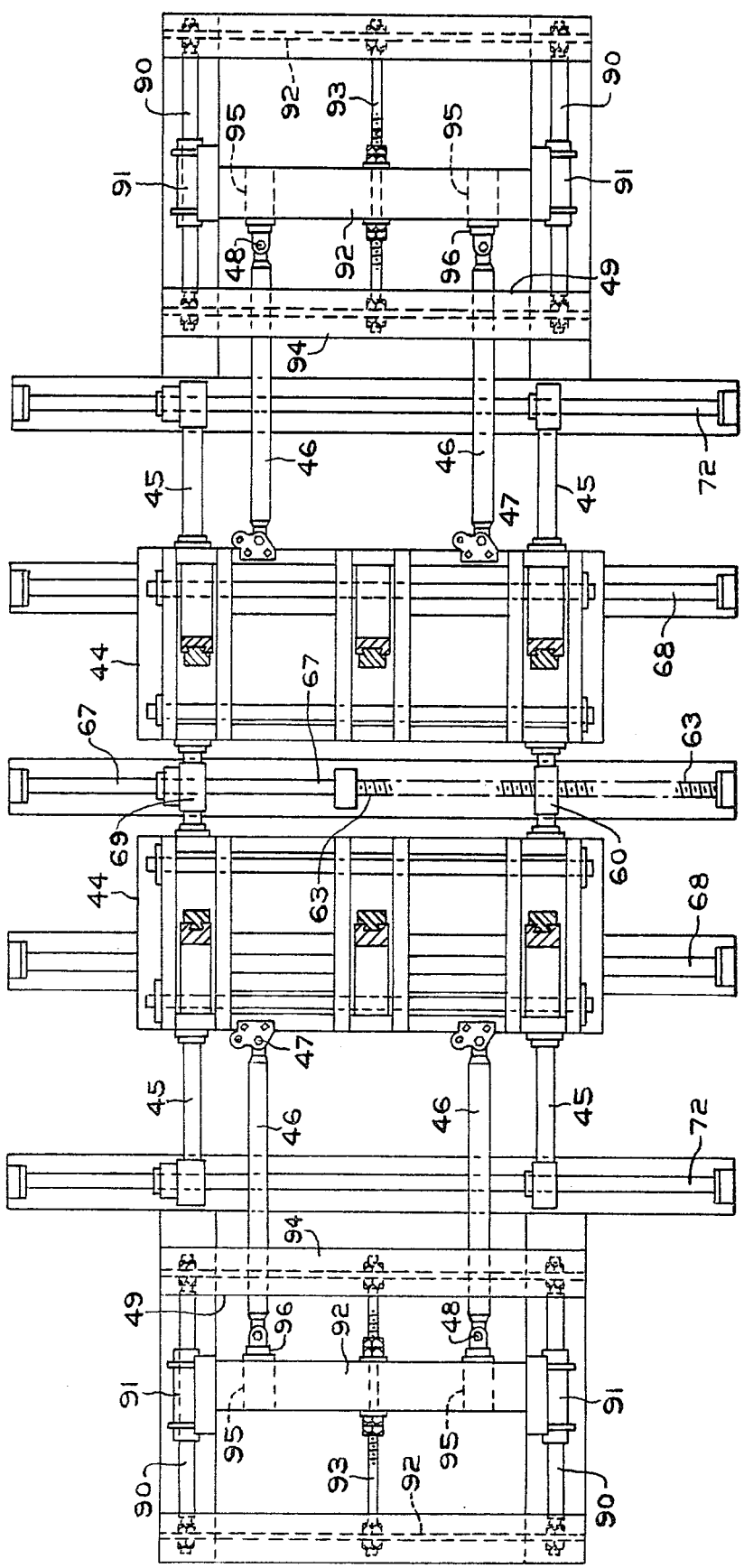
FIG. 5 is a plan view of the mold support structures and actuating means for moving the latter showing how the twin links are oriented to position said mold support structures when their supported molds occupy glass-engaging positions wherein the molds engage the opposite surfaces of the glass sheet during shaping.

Referring to the drawings, a plurality of conveyor rolls 10 is shown aligned longitudinally in a horizontal direction and extending logitudinally of a furnace 12, beyond a door 14 at the exit end of the furnace and then through a shaping station 16 and a cooling area 18, as depicted in FIG. 2. A tong support carriage 20 is shown having an upper runner 21 resting on a plurality of said conveyor rolls 10 so that the carriage may be propelled in a forward direction along an essentially horizontal path of travel defined by the conveyor rolls 10.

The carriage 20 includes vertical connectors 22 interconnecting a side of the runner 21 with a horizontal carriage bar 23. The carriage bar is of angle iron construction and is used to support a pair of externally threaded vertical support rods 24 whose vertical position is adjustable and set by lock nuts that engage the support rods above and below the carriage bar. The bottom of each vertical support rod contains a pivotal connection to a pivoted rod 25. Each pivoted rod supports at least one tong 26 on each side of the pivotal connection to the vertical support rod 24 in a manner well known in the art. The tongs 26 are provided with glass-engaging elements 27 which are arranged to grip the upper surface of the glass sheet G in such a manner that when the glass is supported between a pair of complementary pressing molds the tongs are received in notches 28 aligned along the upper portions of a pair of opposing pressing molds.

The furnace 12 is a typical heating furnace for conveying flat glass sheets in a vertical orientation gripped by tongs and is provided with electric heating elements although other radiant and/or convective heating elements, such as gas heaters, may be provided throughout the length of the furnace in order to provide a heat pattern both longitudinally and transverse to the path of the glass movement through the furnace. The speed of glass sheet movement through the furnace is correlated to the amount of heat supplied by the heaters to have the glass sheet leave the furnace exit at a suitably desired temperature, which is generally on the order of about 1200° to 1250° F. (corresponding approximately to 650° to 675° C.).

The shaping station 16 comprises a pair of press bending molds, preferably of the type depicted in U.S. Pat. No. 3,367,764 to Seymour. The molds include a concave pressing mold 29 having a concave pressing plate 30 facing a convex pressing mold 31 having a convex pressing plate 32. The shapes of the pressing plates are aligned with one another and conform to the shape desired to be imparted to a flat glass sheet gripped by tongs at the shaping station 16. Preferably, the pressing plates 30 and 32 are covered with a layer of fiber glass cloth, preferably of knit fiber glass cloth of the type covered in U.S. Pat. No. 3,148,968 to Cypher and Valchar. The covers are omitted from the drawings to facilitate illustration of the pressing mold construction.

It is preferable that the shaping surfaces of the pressing plates be adjustable. In order to provide this adjustability, an apertured adjusting plate 34 is provided in spaced relation behind the concave pressing plate 30 of concave pressing mold 29 and is relatively rigid compared to the rigidity of the pressing plate 30. Externally threaded spacer shafts 35 are connected to the rear surface of the concave pressing plate 30 and threadedly attached by lock nuts on opposite sides of the adjusting plate 34 to adjust the distance of different localized portions of the concave pressing plate 30 from the apertured adjusting plate 34. A similar provision is made for the convex pressing plate 32 of the convex pressing mold 31. The apertured adjusting plates 34 of each of the pressing molds are connected to corresponding mounting plates 36 through externally threaded connecting shafts 37 which are provided with lock nuts on opposite sides of adjusting plates 34 and on opposite sides of mounting plates 36 to secure the mounting plates 36 in proper spacing behind the corresponding apertured adjusting plates 34.

Vertically adjustable brackets 38 are connected to the rear of mounting plates 36 through horizontal connectors 39. Several uprights 40 (3 of which are shown) are connected through vertical adjustments 42 to adjust the position of each of the pressing molds 29 and 31 relative to the corresponding uprights. Each upright is supported on a support structure 44, one of which is provided for each of the pressing molds. The support structures 44 are apertured to receive a plurality of transverse shaft means 45. The latter extend transversely across the support structures 44 and are constructed and arranged to move longitudinally of the conveyor comprising the conveyor rolls 10 with said support structures while permitting the latter to move along the length of the transverse shaft means transversely of the longitudinal direction.

Normal press bending molds of the prior art are provided with pistons for actuating their movement toward and away from one another in response to the presence of a glass sheet between the pressing plates of the opposite bending molds. In the prior art, such press bending molds were usually fixed in position relative to the longitudinal path of movement of the glass sheets through the shaping station and each glass sheet in turn was held in fixed position therebetween during shaping. According to the present invention, such apparatus has been modified in a novel manner by providing a pair of links 46 to provide a twin link connection through a front pivot 47 which connects the front end of each link to the rear of the support structure 44 and a rear pivot 48 for each link 46 that connects the rear end of the link to a rigid, adjustably fixed support structure to be described subsequently. According to this invention, pivoting of the links 46 in unison moves the pressing plates 30 and 32 first toward one another and then away from one another without changing their orientation relative to one another simultaneously with moving support structures 44 and their associated molds in a longitudinal direction in unison with the glass sheet G through the shaping station. The movement of the support structures 44 is actuated by carriage 20 actuation of a trip switch that initiates longitudinal movement of the support structure in synchronism with the carriage movement so that the molds face the opposite surfaces of the glass sheet as the latter moves through the shaping station 16.

The links 46 of such pair of links for said support structures 44 are of equal length. The longitudinal distance between the front pivots 47 for each support structure 44 is equal to the longitudinal distance between the rear pivots 48. Therefore, when in response to longitudinal movement of the support structures 44, the links 46 pivot in unison about their respective pivots, the support structures 44 and their supported molds are displaced laterally toward and/or away from one another without changing the orientation of the support structures 44 simultaneously with their longitudinal displacement. Since the pressing molds 29 and 31 are rigidly fixed to the support structures 44, their respective pressing plates 30 and 32 also move without any change in orientation on said link-associated movement of said support structures.

At least one of the transverse shaft means 45 of support structure 44 is connected with a common drive bracket 60. The latter comprises an upper sleeve 61 mounted for slidable movement around transverse shaft means 45 and an internally threaded housing 62 mounted for rotation on a longitudinally extending, reversible worm drive 63, as seen in FIG. 2. The worm drive 63 forms part of longitudinal drive means and is connected at one end to a pulley 64 which is connected through a drive belt 65 to a reversible drive motor (not shown).

The common drive bracket 60 is also provided with a lower sleeve 66 oriented normal to the orientation of the upper sleeve 61 to provide for sliding movement along a central longitudinal shaft means 67 which is mounted below the worm drive 63. The worm drive 63 and the central longitudinal shaft means 67 are oriented in a slightly obliquely upward orientation lengthwise of the path of movement taken by the tong support carriages 20 through the shaping station 16 so as to enable the pressing plates 30 and 32 to move obliquely upward in a longitudinal downstream direction as they move laterally inward to grip the glass sheet G therebetween and thus relax the grip of the tongs 27 on the upper edge of the glass somewhat and relieve some of the tong pull that causes damage to the upper edge portion of the glass sheets when the tongs ar not relaxed.

Addition flanking longitudinal shaft means 68 are provided on either side of the central longitudinal shaft means 67. An additional housing 69 is provided with an upper sleeve 70 entrained around the other transverse shaft means 45 and a lower sleeve 71 entrained about the central longitudinal shaft means 67. The length of the worm drive 63 is sufficient to move the two support structures 44 in unison with the lower sleeves 66 and 71 sliding relative to the central longitudinal shaft means 67 between an upstream retracted position depicted in phantom in FIG. 3 through a glass engaging position shown in FIG. 5 and a downstream retacted position depicted in full lines in FIG. 3. During this movement, simultaneous pivoting of the twin links 46 for each of the support structures 44 causes the structures to move transversely in an in-and-out path simultaneous with their longitudinal movement from adjacent the furnace exit to adjacent the entrance to the cooling area 18 without changing the orientation of the pressing plates 30 and 32 of the opposite press bending molds 29 and 31. A pair of end longitudinal shaft means 72 extends parallel to and outside of the flanking longitudinal shaft means 68.

A housing 73 is provided with an upper sleeve 74 slidable along the length of the transverse shaft means 45 and lower sleeve 75 slidable relative to the outer longitudinal shaft means 72. These additional shaft means and sleeves provides balanced support for the support structures 44 during their transverse movement relative to one another.

Additional rigid support structure 89 is provided to the rear of the support for the outer longitudinal shaft means 72 with one structure being the mirror image of the other. The outer longitudinal shaft means 72 are supported on part of the rigid support structure 89. The latter extends rearwardly to support a pair of upper end slide rods 90, each bearing a sleeve 91 for longitudinal sliding relation relative thereto. The sleeves 91 are interconnected by a transversely extending cross housing 92. A threaded adjustment rod 93 extends from a front cross beam 94 which also supports the front end of each of the upper end slide rods 90. A pair of spring housings 95 is connected to the underside of the cross housing 92. Each housing 95 supports a spring-loaded plug 96 (FIG. 4) which is rigidly attached within housing 95 and provided with a stem 97 and externally threaded for adjustment of the plug 96 relative to a spring 98 within the spring housing 95 to adjust the tension or compression of the spring 98 against the rear pivot 48 for the link 46 with which it is associated, thereby biasing both twin links 46 against their connected support structure 44 toward the opposite support structure.

The spring biasing of the rear pivots 48 is preferably provided for just the concave pressing mold 29, but may be provided for either or both of the molds. This biasing of one of both of the molds toward one another increases the pressing time of the glass so as to increase the time that the glass is shaped during the time of its transit from the exit of the furnace 12 until it enters the cooling area 18.

It is essential that the orientation of the pressing plates 30 and 32 be maintained throughout the shaping operation. Accordingly, the present invention provides twin links 46 of equal length that pivot in response to movement of the support structures 44 parallel to the direction of glass movement and equal spacing between the front pivots 47 and the rear pivots 48 to simultaneously impart broadside motion to said support structures 44 transverse to the direction of glass movement through the shaping station 16 without pivoting either support structure 44 or its supported mold. In addition, the screw drive 63 that controls longitudinal movement of the support structures 44 is synchronized with the movement of each carriage 20 through the shaping station 16 so that the pressing plates 30 and 32 engage the opposite major surfaces of the glass sheet during simultaneous longitudinal movement of the molds and the carriage at the same rate of longitudinal speed.

A glass sensing means which may take the form of a limit switch actuated by the runner 21 of the tong support carriage 20 initiates the opening of the furnace exit door 14 and brings the glass into a position of alignment with the opposing pressing molds 29 and 31. The molds are in their upstream retracted position sufficiently far apart to enable a flat glass sheet to move between the retracted molds. When the glass comes into proper alignment between the molds, the worm drive 63 is actuated in synchronism with the continued movement of the conveyor rolls 10 to cause the complementary pressing molds 29 and 31 to move toward one another, the spring loading from the spring 98 causing the molds to maintain a pressing position for a longer portion of the path of travel of the glass between the furnace exit door 14 and the entrance to the cooling area 18 than would be the case if such spring loading were missing.

The pressing molds occupy the upstream recessed positions that correspond to the positions of the twin links 46 as depicted in phantom in FIG. 3 while awaiting the arrival of a glass sheet. As the support structures 44 and carriage 20 simultaneously and at equal speeds move downstream, the links 46 pivot to move the molds into the pressing position depicted in FIG. 5. Finally, the links 46 continue to pivot into the full line positions of FIG. 3 to separate the longitudinally moving molds from one another as the support structures 44 are caused to separate due to the inclination of the twin links 46 away from their FIG. 5 positions that cause the support structures 44 to separate from one another. The glass sheet is not stopped during its passage between the exit of the furnace and the entrance to the cooling area. The glass is not overheated by being maintained at a holding area for a considerable period of time. The pressing action and the transfer of the glass sheet from the furnace to the cooling area takes place within about five seconds so that glass sheets as thin as three millimeters may be shaped without difficulty.

The worm drive 63 is immediately reversed while the carriage 20 moves forward. A second limit switch suitably located along the path traversed by the carriage 20 is actuated to reverse the worm drive 63 to return the pressing molds and their support structures 44 to their upstream retracted positions immediately outside the furnace exit. These upstream positions are retracted from the path of flat glass movement a sufficient distance to provide clearance for the entrance of the next carriage 20 carrying a glass sheet to be shaped to a position between the shaped molds.

The form of the invention shown and described in this disclosure represents an illustrative preferred embodiment thereof. It is understood that various changes may be made in the light of the description of said embodiment without departing from the gist of the invention as defined in the claimed subject matter that follows.

I claim:

1. A method of press bending a glass sheet supported in an upright orientation comprising combining the steps of moving said glass sheet continuously in a longitudinal direction from a heated atmosphere into a cooling area while supporting a pair of pressing molds of complementary shape on opposite sides of said moving glass sheet with their shaping surfaces aligned with one another and moving said pressing molds in unison from upstream retracted positions adjacent said heating atmosphere in said longitudinal direction toward said cooling area in transverse alignment with said moving glass sheet and simultaneously toward the opposite major surfaces of said upright glass sheet while maintaining said aligned orientation of said pressing molds relative to one another and to the major surfaces of said glass sheet until said pressing molds impart their complementary shapes onto the glass sheet and then retracting said pressing molds from glass sheet engagement without stopping the glass sheet until said glass sheet is exposed to blasts of tempering medium applied against its opposite surfaces.

2. A method as in claim 1, further including returning said pressing molds to said upstream retracted positions adjacent said heated atmosphere in said aligned orientation to await the arrival of a succeeding glass sheet therebetween.

3. A method as in claim 1 or claim 2, wherein said glass sheet is gripped by tongs along its upper edge and said pressing molds are moved toward one another in transverse alignment with said moving glass sheet while moving longitudinally of the longitudinal path of said glass sheet in an obliquely upward direction relative to the longitudinal movement of the glass sheet from the heated atmosphere toward said cooling area while continuing to maintain said aligned orientation of said shaping surfaces to minimize tong pull resulting from mold engagement against the opposite major surfaces of said glass sheet.

4. Apparatus for press bending a glass sheet supported vertically by tongs comprising a heated furnace, a shaping station and a cooling area disposed in end to end relation, a conveyor for moving said glass sheet along an essentially horizontal path through said heated furnace, said shaping station and said cooling area, said shaping station comprising a pair of pressing molds having shaping surfaces of complementary configuration, a support structure on each side of said path, each of said support structures having one or the other pressing molds rigidly attached thereto in a predetermined selected position and with the shaping surfaces in aligned orientation with one another, a pair of links each having a front pivotal connection to the rear of one or the other of said support structures, a rear pivotal connection for each of said links connecting each of said links to a fixed structure, said links being of equal length and the distance between said front pivotal connections being equal to the distances between said rear pivoted connections, transverse shaft means common to said pair of support structures, said pair of support structures being mounted for movement along said transverse shaft means in response to pivoting of said links, longitudinal drive means drivingly connected to said transverse shaft means for moving said support structures in unison in a direction longitudinal of said conveyor, longitudinal shaft means to guide said movement longitudinal of said conveyor, means coordinating the longitudinal movement of said support structures with movement of a glass sheet along said conveyor, and means to maintain said pressing molds in said aligned orientation while moving said support structures in unison with said glass sheet from an upstream retracted position adjacent said heated furnace through a glass engaging position at said shaping station to a downstream retracted position adjacent said cooling area in response to the pivoting of said links in response to movement of said support structures along said longitudinal direction of movement.

5. Apparatus as in claim 4, wherein said longitudinal drive means and said longitudinal shaft means are constructed and arranged to move said pressing molds in a slightly upward sloped direction of movement relative to a longitudinal path of travel of said glass sheet defined by said conveyor.

6. Apparatus as in claim 4, further including means to reverse the operation of said longitudinal drive means to return said pressing molds in said aligned orientation to said upstream retracted positions in time to receive another glass sheet to be press bent during continuous movement.

7. Apparatus as in claim 4 or claim 5 or claim 6, futher including spring loaded means associated with the rear pivotal connections for at least one of said pair of links associated with one of said support structures, said spring loaded means being constructed and arranged to bias said one support structure toward said other support structure to increase the duration of pressing mold engagement against the opposite major surfaces of said glass sheet.

* * * * *